United States Patent Office 3,773,841
Patented Nov. 20, 1973

3,773,841
1-CHLORO-2,2,3,3-TETRAFLUOROPROPYL
DIFLUOROMETHYL ETHER
Bernard M. Regan, Chicago, Ill., assignor to Baxter
Laboratories, Inc., Morton Grove, Ill.
No Drawing. Original application Aug. 10, 1970, Ser. No.
62,679, now Patent No. 3,689,459. Divided and this
application July 3, 1972, Ser. No. 268,365
Int. Cl. C07c 43/00, 43/12
U.S. Cl. 260—614 F                    1 Claim

ABSTRACT OF THE DISCLOSURE

The compound 1-chloro-2,2,3,3-tetrafluoropropyl difluoromethyl ether useful as an intermediate in making an anesthetic agent.

This is a division of application Ser. No. 62,679 filed Aug. 10, 1970 and now Pat. No. 3,689,459.

The present invention relates to the novel organic compound difluoromethyl 1,2,2,3,3-pentafluoropropyl ether, $CHF_2$—O—CHF—$CF_2$—$CHF_2$, and to its method of use as a general anesthetic agent.

A closely related isomer, $$CF_3-O-CH_2-CF_2-CHF_2$$

has been described by Aldrich and Sheppard, J. Org. Chem., vol. 29, pp. 11–15 (1964), to be a highly lethal convulsant agent when inhaled by mice at 0.5 volume percent concentration. Another closely related isomer, $CHF_2$—O—$CH_2$—$CF_2$—$CF_3$, has now been found to be convulsant and non-anesthetic in mice. Furthermore, a precursor, $CHF_2$—O—$CH_2$—$CF_2$—$CHF_2$, to the compound of this invention also has now been found to be a convulsant agent and devoid of anesthetic activity in mice. Therefore, the discovery that the present compound, $CHF_2$—O—CHF—$CF_2$—$CHF_2$, has excellent anesthetic properties in warm-blooded, air-breathing animals was surprising and unexpected.

The novel anesthetic compound of this invention provides smooth anesthesia in mice. It is highly potent, having a median anesthetic concentration ($AC_{50}$) of 0.61 volume percent, and has a high margin of safety ($LC_{50}$/$AC_{50}$) of 6.5 upon inhalation in admixture with air for five to ten minutes. ($LC_{50}$=median lethal concentration.)

Repeated inhalation anesthesia with the present compound was well tolerated by a dog (15 kilogram male beagle). On each of five successive days anesthesia was induced with 6 volume percent in oxygen and then maintained with 2 volume percent for the duration of each three hour exposure. Anesthesia was maintained each day at a depth sufficient to abolish response to pain. No signs of subacute or cumulative toxicity were produced. Body weight was maintained at about 15 kilograms throughout the five day period of anesthesia. No evidence of any cardiac arrhythmia or bradycardia was observed. Blood pressure stabilized at about 100/60 during the three hour maintenance period on the first day of anesthesia. Respiratory rate usually stabilized at about ten breaths per minute and respiratory minute volume stabilized at two liters per minute. Electroencephalograms (EEG) were normal during maintenance of anesthesia. Periods of burst suppression observed on the frontal-occipital EEG after prolonged exposure to an anesthetic concentration of 6 volume percent were abolished by lowering the concentration to 2 volume percent.

The anesthetic compound of this invention is non-flammable in air and non-explosive in oxygen or nitrous oxide. Its lower flammability limits (LFL) with flame ignition are about 7.9 volume percent in oxygen and about 9.7 volume percent in nitrous oxide.

The present anesthetic compound is stable to soda-lime as determined by gas-liquid chromatography (GLC). Therefore, it is eminently suitable for use in anesthetic procedures which employ soda lime for the absorption of carbon dioxide.

Difluoromethyl 1,2,2,3,3-pentafluoropropyl ether is a colorless, volatile liquid which boils at a temperature of about 74.5° C. at 760 torr and has a density of about 1.55 grams/ml. at 20° C. It has a pleasant ethereal odor.

The novel anesthetic compound of this invention can be prepared according to the general reaction scheme as follows:

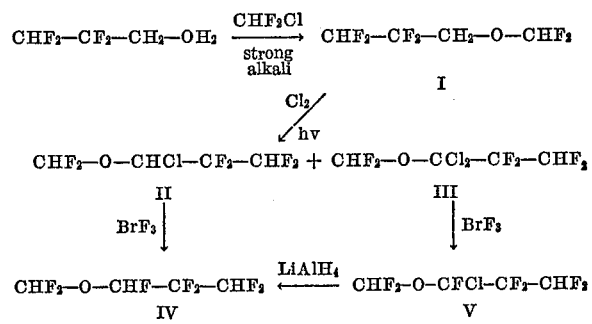

In the above reaction scheme, 2,2,3,3-tetrafluoropropanol and chlorodifluoromethane are converted in the presence of strong alkali, for example, sodium hydroxide or potassium hydroxide, to the novel difluoromethyl ether I. From about 1.5 to about 2.0 moles of $CHF_2Cl$ and about 5 moles of NaOH or KOH per about one mole of the alcohol are preferred. The reaction temperature preferably is from about 5° C. to about 25° C. In carrying out this reaction, it is advantageous to employ a mutual solvent, for example, a water-miscible, relatively high boiling, non-reactive solvent such as diethyleneglycol dimethylether.

The ether I can be chlorinated with a chlorinating agent such as chlorine or sulfuryl chloride in the presence of ultraviolet light to obtain the novel chlorether II. From about 0.5 to about 1.5 moles of chlorine per mole of I and a reaction temperature of from about 15° C. to about 30° C. are preferred.

It is preferable to free II of I before proceeding to convert II to the novel anesthetic compound IV of this invention, since I and IV are difficult to separate by fractional distillation as their boiling points differ by only 1° C. A secondary chlorination product, essentially the new dichloroether III, is difficult to separate from II by fractional distillation.

The novel anesthetic compound IV of the present invention can be prepared by exchange of chlorine for fluorine between the chloroether II and bromine trifluoride. From about one-third to about one-half mole of $BrF_3$ per about one mole of II and a reaction temperature of from about 25° C. to about 60° C. are preferred.

Mixtures of chloroether II and dichloroether III can be converted to IV by reaction with bromine trifluoride followed by partial reduction with lithium aluminum hydride. In this reaction, $BrF_3$ replaces one chlorine in III with fluorine to give V and $LiAlH_4$ replaces the remaining chlorine in V with hydrogen to give IV. The reaction with $LiAlH_4$ is advantageously carried out in the presence of a solvent such as diethyleneglycol diethylether.

The following examples will further illustrate the invention although the invention is not limited to these examples. All parts and percentages herein are by weight unless otherwise specified.

EXAMPLE 1

Difluoromethyl 2,2,3,3-tetrafluoropropyl ether (I)

2,2,3,3-tetrafluoropropanol (520 grams) was added to a stirred mixture (at 5° C.) of sodium hydroxide (790 grams), water (1240 ml.) and diethyleneglycol dimethylether (1880 ml.) in a stirred reactor fitted with a Dry Ice cooled condenser. Then chlorodifluoromethane (565 grams) was bubbled during 2.5 hours into the resulting mixture which was kept between 6° C. and 22° C. with external cooling. The viscous reaction mixture was stirred on additional hour at 15° C. to 20° C. and then the excess sodium hydroxide was neutralized by the addition of concentrated hydrochloric acid (1070 grams) during one hour at 15° C. to 20° C.

The upper liquid layer was separated and distilled to obtain a product boiling from 60° C. to 92° C. which was washed, neutralized, freeze dried at −20° C. (341 grams) and fractionally distilled to give I (291 grams) $b_{747}$ 74.7° C.–75.5° C., $d^{21}$ 1.47.

The low resolution proton nuclear magnetic resonance (NMR) spectrum of I is (1) a triplet centered at 6.18 p.p.m. for the methyl proton coupled (J=72 Hz.) to the two methyl fluorines, (2) a triplet centered at 4.14 p.p.m. for the two propyl protons near oxygen coupled to two vicinal fluorines (J=12.5 Hz.) and (3) a triplet of triplets centered at 5.81 p.p.m. for the other propyl proton coupled to two geminal fluorines (J=52 Hz.) and two vicinal fluorines (J=4.5 Hz.). These line positions are relative to external tetramethyl silane.

EXAMPLE 2

1-chloro-2,2,3,3-tetrafluoropropyl difluoromethyl ether (II)

Chlorine (23 grams was bubbled into I (73 grams) at 5° C. to 10° C. during about 6 hours with stirring and with irradiation from a sun lamp. Gas-liquid chromatographic (GLC) and proton NMR analyses indicated the product to be 65% II, 29% I and 6.3%

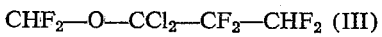

CHF$_2$—O—CCl$_2$—CF$_2$—CHF$_2$ (III)

The product mixture (80 grams) was washed, neutralized, dried and fractionally distilled to give II (29.4 grams) $b_{744}$ 94.6° C. to 95.4° C. of about 96.4% purity with III as the major impurity.

The low resolution proton NMR spectrum of II is (1) a pair of doublets centered at 6.21 p.p.m. for the methyl proton coupled to the non-equivalent methyl fluorines (J=69–70 and 70–71 Hz.), (2) an apparent triplet centered at 5.96 p.p.m. for the propyl proton near oxygen coupled to two vicinal fluorines (J=7–8 Hz.) and (3) a triplet of triplets centered at 5.87 p.p.m. for the other propyl hydrogen coupled to two geminal fluorines (J=52 Hz.) and two vicinal fluorines (J=5 Hz.).

EXAMPLE 3

Difluoromethyl 1,2,3,3-pentafluoropropyl ether (IV)

Chlorine (392 grams) was bubbled into I (914 grams) at about 15° C. during 6 hours with irradiation from a sun lamp and with stirring. Analysis by GLC indicated the product was 73% II, 15.7% III and 9.9% I. The product mixture was washed, neutralized, dried and fractionally distilled to remove I (in fractions $b_{750}$ 74° C. to 95.2° C. totaling 165 grams) until the residue (900 grams) contained less than 0.1% I by GLC.

In the same manner, a similar residue (210 grams) was obtained from chlorine (122 grams) and I (284 grams).

The two residues were combined (1118 grams, 81.7% II and 17.3% III by GLC) and stirred as bromine trifluoride (260 grams) was added at a rate to maintain a reaction temperature of about 55° C. under reflux. After stirring overnight (about 16 hours), the remaining BrF$_3$ was decomposed by cautious addition of water. The product was then freed of halogens, neutralized and dried to give crude IV (937 grams) containing an impurity V (essentially CHF$_2$—O—CFCl—CF$_2$—CHF$_2$ derived from III and BrF$_3$), which was not completely separated from IV by fractional distillation and had a longer retention time than IV on a 15% diisodecyl phthalate Chromasorb P column.

Crude IV (918 grams) in dry diethyleneglycol dimethylether (600 ml.) was treated with 0.9 molar lithium aluminum hydride in diethyleneglycol diethylether (266 ml.) at a temperature ranging from 25° C. to 75° C. until V was no longer detectable by GLC. Distillation of IV from the reaction mixture under reduced pressure followed by fractional distillation gave IV (805 grams) $b_{760}$ 74.3° C. to 74.5° C., $d_4^{23}$ 1.55 grams/ml. of 99.4% purity by GLC.

The low resolution proton NMR spectrum of IV is (1) a triplet centered at 6.10 p.p.m. for the methyl proton coupled (J=71 Hz.) to the two methyl fluorines, (2) a triplet of doublets centered at 5.68 p.p.m. for the propyl proton near oxygen coupled to a geminal fluorine (J=55 Hz.) and two vicinal fluorines (J=5.5 Hz.) and (3) a triplet of triplets centered at 5.63 p.p.m. for the other propyl proton coupled to two geminal fluorines (J=53 Hz.) and two vicinal fluorines (J=5 Hz.).

Various other examples and modifications of the foregoing examples will be apparent to those skilled in the art after reading the disclosure hereof without departing from the spirit and scope of the invention. All such further examples and modifications are included within the scope of the invention as defined in the appended claims.

What is claimed is:

1. 1 - chloro - 2,2,3,3-tetrafluoropropyl difluoromethyl ether.

References Cited

UNITED STATES PATENTS

| | | | |
|---|---|---|---|
| 3,461,213 | 8/1969 | Terrell | 260—614 FX |
| 3,469,011 | 9/1969 | Terrell | 260—614 FX |
| 3,535,388 | 10/1970 | Terrell | 260—614 F |

HOWARD T. MARS, Primary Examiner